US008600960B2

(12) United States Patent
Fischer et al.

(10) Patent No.: US 8,600,960 B2
(45) Date of Patent: *Dec. 3, 2013

(54) PROCESSING PROPOSED CHANGES TO DATA

(75) Inventors: Uwe E. Fischer, Karisruhe (DE); Paresh Deshpande, Bangalore (IN); Biju Jatheendran, Bangalore (IN)

(73) Assignee: SAP AG, Walldorf (DE)

( * ) Notice: Subject to any disclaimer, the term of this patent is extended or adjusted under 35 U.S.C. 154(b) by 1651 days.

This patent is subject to a terminal disclaimer.

(21) Appl. No.: 11/404,404

(22) Filed: Apr. 14, 2006

(65) Prior Publication Data

US 2007/0118597 A1    May 24, 2007

(30) Foreign Application Priority Data

Nov. 22, 2005    (IN) .......................... 3123/DEL/2005

(51) Int. Cl.
*G06F 17/00* (2006.01)
*G06F 17/30* (2006.01)
*G06F 15/16* (2006.01)

(52) U.S. Cl.
CPC ............... *G06F 17/30* (2013.01); *G06F 17/00* (2013.01); *G06F 15/16* (2013.01)
USPC ........... 707/703; 707/602; 707/615; 707/683; 707/684; 709/203; 709/206

(58) Field of Classification Search
USPC .......... 707/1–2, 8, 100, 102, 103 Y, 200, 201, 707/203, 602, 615, 648–649, 682, 683–684, 707/703; 706/45–50; 709/203, 218–220, 709/206

See application file for complete search history.

(56) References Cited

U.S. PATENT DOCUMENTS

| | | | | |
|---|---|---|---|---|
| 5,170,480 | A * | 12/1992 | Mohan et al. ................. | 707/201 |
| 5,642,504 | A * | 6/1997 | Shiga .............................. | 707/10 |
| 6,035,297 | A * | 3/2000 | Van Huben et al. ............. | 707/8 |
| 6,073,141 | A * | 6/2000 | Salazar ......................... | 707/204 |
| 6,321,236 | B1 * | 11/2001 | Zollinger et al. ............. | 707/203 |
| 7,181,453 | B2 * | 2/2007 | Ronstrom ........................ | 707/8 |
| 7,266,565 | B2 * | 9/2007 | Diab ............................ | 707/102 |
| 2003/0149709 | A1 * | 8/2003 | Banks .......................... | 707/200 |
| 2003/0159136 | A1 * | 8/2003 | Huang et al. .................. | 717/171 |
| 2005/0289189 | A1 * | 12/2005 | Nettleton et al. ............. | 707/200 |
| 2007/0118572 | A1 * | 5/2007 | Fischer et al. ................ | 707/201 |
| 2007/0130224 | A1 * | 6/2007 | Fischer et al. ................ | 707/203 |

FOREIGN PATENT DOCUMENTS

| | | | | |
|---|---|---|---|---|
| GB | 2394816 | * | 5/2004 | |
| WO | WO 93/04436 | * | 3/1993 | ............ G06F 15/403 |

* cited by examiner

*Primary Examiner* — Srirama Channavajjala
(74) *Attorney, Agent, or Firm* — Schwegman, Lundberg & Woessner, P.A.

(57) ABSTRACT

Processing proposed changes to data includes notifying a server of a proposed change to master data, receiving, from the server, an indication as to whether there is a concurrent change to the master data, where the concurrent change corresponds to a change to the master data in addition to the proposed change, and deciding whether to make the proposed change or to abort the change.

20 Claims, 3 Drawing Sheets

US 8,600,960 B2

PROCESSING PROPOSED CHANGES TO DATA

TECHNICAL FIELD

This patent application relates, in general, to processing proposed changes to data and, more particularly, to detecting concurrent changes to master data and either accepting or rejecting one or more proposed changes.

BACKGROUND

A single entity, such as a company, may include multiple data management systems. For example, there may be a customer relationship management (CRM) system, a marketing system, and master system. These data management systems may each contain copies of the same data. For example, each data management system may contain a customer record, which includes information such as a customer's name, address, telephone number, social security number, and the like. Changes to information in one data management system may need to be propagated to other data management systems in order to ensure that the data in all systems is consistent. Problems may arise, however, if two systems are trying to update the same data concurrently. Another type of concurrent change occurs if that data has been updated previously and the updates have not yet been propagated to the system or systems currently trying to update the data.

SUMMARY

This patent application describes methods and apparatus, including computer program products, for detecting concurrent changes to master data and either accepting or rejecting one or more proposed changes.

In general, in one aspect, the invention is directed to processing proposed changes to data by notifying a server of a proposed change to master data, receiving, from the server, an indication as to whether there is a concurrent change to the master data, where the concurrent change comprises a change to the master data in addition to the proposed change, and deciding whether to make the proposed change or to abort the change. This aspect of the invention may also include one or more of the following features.

The foregoing method may be performed by a client of the server. Communications between the client and the server may be effected via services. Deciding whether to make the proposed change or to abort the change may include requesting, and receiving, an input from a user regarding whether to make the proposed change or to abort the change.

The foregoing method may also include making the proposed change to the master data, notifying the server that the proposed change has been made, and receiving an indication as to whether there is a subsequent concurrent change to the master data. If there is a subsequent concurrent change to the master data, the foregoing method also includes requesting, and receiving, an input from a user regarding whether to save the proposed change or to abort the change. If the input indicates to save the proposed change, the foregoing method includes instructing the server to save the proposed change, and receiving an instruction from the server to save the proposed change. The proposed change may be saved in response to the instruction.

In general, in another aspect, the invention is directed to processing proposed changes to data by receiving a first input indicative of a proposed change to master data, determining whether there is a concurrent change to the master data, where the concurrent change comprises a change to the master data in addition to the proposed change, and receiving a second input to make the proposed change or to abort the change. This aspect of the invention may also include one or more of the following features.

The foregoing method may be performed by a server. The first input and the second input may be effected via Web services. Determining whether there is a concurrent change to the master data may include comparing first metadata associated with the proposed change to second metadata on the server, where the second metadata corresponds either to the master data or to a second proposed change to the master data. The foregoing method may also include outputting an indication that there is a concurrent change to the master data. The second input may be received in response to the indication.

The first metadata may identify a version of the possible update and a version of the master data upon which the possible update is based, and the second metadata may identify a current version of the master data and a version of the master data upon which the current version is based. The first metadata may identify a version of the possible update and a version of the master data upon which the possible update is based, and the second metadata may identify a version of the second possible update and a version of the master data upon which the second possible update is based.

The details of one or more examples are set forth in the accompanying drawings and the description below. Further features, aspects, and advantages of the invention will become apparent from the description, the drawings, and the claims.

DESCRIPTION OF THE DRAWINGS

Like reference numerals in different figures indicate like elements.

DETAILED DESCRIPTION

Figure 1:
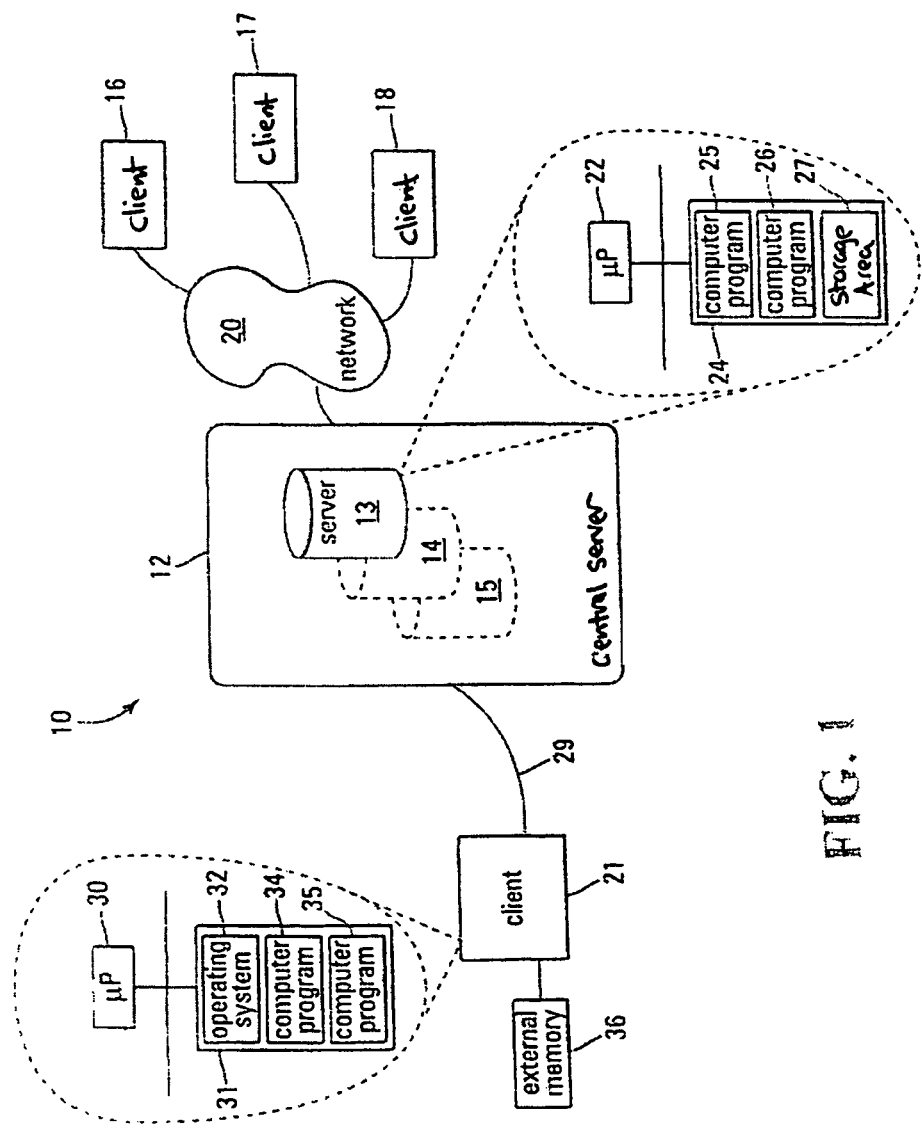
FIG. 1 is a block diagram of a computer system on which the processes described herein may be implemented.

FIG. 1 shows an example of a computer system 10, on which the processes described herein may be implemented. In this regard, it is noted that the processes are described below in the context of master data stored in a central server. The processes, however, are not limited to this particular use or implementation. As noted below, the processes may be used in the context of any process (e.g., computer program) to detect concurrent changes to any type of data and either to accept or to reject one or more of those changes.

Referring to FIG. 1, computer system 10 includes a central server 12. Central server 12 may include one or more devices, such as one or more servers 13 to 15, which store a library of data objects. These data objects constitute master data and are accessible to one or more clients, which are described below. In this context, master data is information that is common to different locations and/or processes in a system landscape. Master data thus can be referenced by multiple systems and/or or applications in a system landscape, such as, e.g., a product lifecycle management system, a customer relationship management system, a supply chain management system, and a manufacturing system, even if these systems are executed at different data processing systems in the landscape.

Master data is stored here as data objects. Generally, a data object is a collection of information that is grouped together and treated as a primitive in a data processing environment. A data object is generally free of internal references and information stored in a data object can be changed without concomitant changes to the data processing instructions that handle the data object. The information in a data object can be stored in a contiguous block of computer memory of a specific size at a specific location.

The master data may be relevant to data processing activities at the different data processing devices. For example, master data may be relevant to data processing activities, such as interaction with a user, at a client and to data processing activities, such as application software, at server 12. Master data may also be relevant to multiple applications at individual data processing devices.

As a consequence of this widespread relevance of master data collections, multiple, corresponding versions of the collections of master data may be stored individually at different data processing devices in computer system 10. Corresponding versions of the master data collections include at least some identical information and are maintained by master data management processes to ensure that this information remains harmonized at the different locations. However, the corresponding versions of the master data collections need not be identical. For example, a collection at one data processing device can be redacted based on the data processing activities commonly performed at that device or based on the data access rights that have been granted to users at that device.

Central server 12 may include one server 13 or multiple servers 13 to 15 (servers 14 and 15 are depicted using dashed lines to indicate that they are optional). In the case of multiple servers, server 13 may act as a controller or "load balancer" for the remaining servers 14 and 15. In this role, server 13 may route data, requests, and instructions between an "external device" (e.g., a client 16) and a "slave" server, such as server 14. For example, server 13 may store objects locally until it is full, then route data to a server with staging area, such as server 14. For the purposes of the following description, such internal communications between server 13 and the slave servers will be assumed.

Server 13 may be any type of processing device that is capable of receiving and storing data, and of communicating with its clients. As shown in FIG. 1, server 13 includes one or more processors 22 and memory 24 that stores computer programs that are executed by processor(s) 22. In this regard, memory 24 stores a computer program 25 for communicating with its clients, e.g., to receive a proposed change from a client, and to post proposed changes for use by clients 16, 17, 18, and/or 21. Memory 24 also contains a computer program 26 for use in storing data objects (e.g., master data) in central server 12, and may also contain staging area 27 to store, temporarily, proposed changes to master data while a concurrency detection process is performed on the data. Computer program 36 may also be used to process proposed changes to master data on server 12. The proposed changes may include information identifying their source, e.g., client 16, 17, etc. Staging area 27 may be external to server 13 even though it is depicted as internal to server 13.

Client 21 may also be any type of processing device that is capable of obtaining data objects and of transmitting those data objects to server 12. A high-speed data link 29, such as Ethernet, may connect client 21 to server 12. The connection may be local or remote. That is, client 21 may also access server 12 via network 20.

As shown in FIG. 1, client 21 includes one or more processor(s) 30 and memory 31 that stores computer programs that are executed by processor(s) 30. In this regard, memory 31 stores an operating system 32, a computer program 34 that enables communication between client 21 and server 12, and a computer program 35 for implementing a concurrency detection process that includes, among other things, determining if two devices are trying to make changes to the same master data at server 12. Complete copies of data objects (i.e., master data) that are stored in server 12 may also be stored on client 21 and on each of clients 16 to 18. Furthermore, each client 16 to 18 may have a hardware/software configuration that is the same as, or different than, client 21.

In this regard, clients 16 to 18 and 21 may be computers or any other data processing apparatus including, but not limited to, desktop or laptop computers, personal digital assistants ("PDAs"), and mobile telephones. Network 20 provides a communication link between server 12 and clients 16 to 18. Network 20 may include, but is not limited to, a local area network ("LAN"), a wide area network ("WAN"), the Internet, and/or a wireless link (e.g., a wireless fidelity, or "Wi-Fi", link).

Each data object in system 10 may have associated metadata that contains one or more identifiers for the data object. In particular, the metadata identifies the current version of the master data from a client (hereinafter, "the client master data") and the original version of the master data upon which the client master data is based (hereinafter, "the original master data"). For example, the client master data may be an altered version of the original master data. The metadata may define one or more tokens (described below), which identify the client master data and the original master data.

Figure 2:
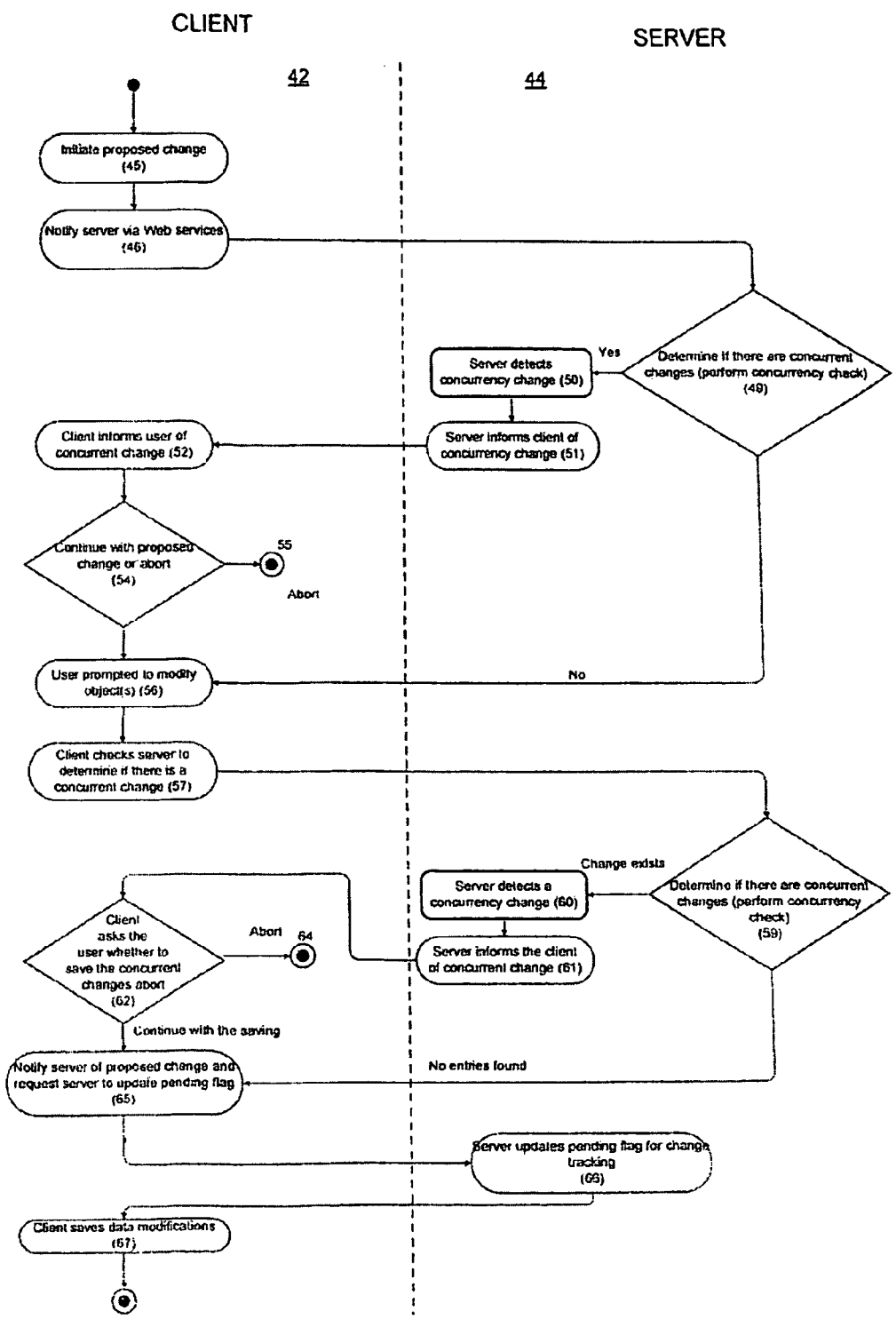
FIG. 2 is a flowchart of a process, which involves a client and a server, for deciding whether to continue with a proposed change on the client side or to abort the proposed change.

FIG. 2 shows a process 40 that detects whether two devices (e.g., clients 16 and 21) are attempting to change the master data in server 12. Process 40 includes two stages 42 and 44. Stage 42 is performed on a client, such as client 21, and stage 44 is performed on server 12. Stage 42 may be implemented by computer program 35. Stage 44 may be implemented by computer program 26.

In stage 42, client 21 initiates a proposed change (45) to its copy of master data. For example, client 21 may wish to modify a telephone number that is stored in a data object on client 21. Thereafter, client 21 notifies (46) server 12 of the proposed change to the master data. It is noted that communications between client 21 and server 12 may be effected via services, such as, but not limited to, Web Services, HyperText Transfer Protocol (HTTP), eXtensible Markup Language (XML), and various other protocols. For example, a user may enter the proposed change at client 21 on a Web-based graphical user interface (GUI), such as a Web page. The identity of the master data object (or other entity) that is subject to the proposed change may be sent to server 12 from the GUI.

In its communication (46) to server 12, client 21 asks server 12 whether there are any concurrent changes to the same master data object. One aim of this communication is to make client 21 aware of any concurrent changes to the master data object before spending time making the proposed change. In this context, a concurrent change is a change to a master data object (or other entity), in addition to the change proposed by client 21, of which client 21 is not aware and which is not synchronized with the proposed change. For example, if client 21 is attempting to modify a data object, client 21 asks server 12 if any client or server is attempting also to modify, or has modified, the same data object.

In its communication (46) to server 12, client 21 identifies the master data object that is subject to the proposed change. The communication may contain an identifier for the object, the proposed change only, the entire object including the proposed change, or some combination thereof. In this regard, metadata associated with the proposed change may define one or more identifiers for the proposed change. In one implementation, the object may be identified by memory address(es), object identifier(s), version, system on which the object resides, and/or other attributes that may be part of the metadata. The metadata may define one or more tokens, which may be any type of identifier, such as a time-stamp, a version identifier, or a global unique identifier (GUID). The tokens may identify the client (or system) from which the proposed change originated. In one implementation, the object is identified by version identifier (ID) and system ID tokens. The VersionID and SystemID may be patterned as follows: "VersionID" (SystemID), e.g., "A" (Server 12) and "B" (Client 21).

Server 12 receives, from client 21, the metadata and the identity of the object that is subject to the proposed change (and, perhaps, the object itself). When server 12 receives this information, server 12 stores the identity of the object and associated metadata in staging area 27. Server 12 also switches on a pending flag (e.g., one or more bits) identifying the object that is subject to the proposed change to indicate that a change to the server master data is pending. Server 12 determines (49) whether there are any concurrent changes pending for the master data stored on server 12.

To detect a concurrent change, server 12 checks for another pending flag relating to the same object as the proposed change. If the pending flag is on, (e.g., for a pending change by client 16), server 12 compares the metadata for the proposed change from client 21 with the metadata for the pending proposed change from, e.g., client 16. If the metadata from both proposed changes indicates that they independently affect the same data, server 12 detects (50) a concurrent change to the server master data. For example, server 12 may have stored, in staging area 27, a proposed change from client 16 along with metadata identifying the proposed change as a version "C" (Client 16) of original master data version "A" (Server 12). Server 12 may receive, from client 21, a proposed change with metadata identifying the proposed change as a version "B" (Client 21) of original master data "A" (Server 12). Using this metadata, server 12 is able to ascertain that both clients 16 and 21 are attempting to change the same server master data.

If server 12 detects (50) a concurrent change, server 12 sends a message to client 21 informing (51) client 21 of the concurrent change. This could be done as separate service call to the client or as a response of the server to the client's initial communication (46).

Client 21 receives the message from server 12 and, in view of the concurrent change, decides whether to make the proposed change or to abort the proposed change. In this implementation, client 21 informs (52) a user of the concurrent change at server 12, which results from the proposed change. For example, client 21 may provide a pop-up window or other visual or audio indication to the user. The user then provides an input, based on which client 21 decides (54) whether to continue with the proposed change or to abort the proposed change. If client 21 decides to abort (55) the proposed change, process 40 ends, at least with respect to the current proposed change. Concurrent changes are thereby prevented. If client 21 decides to continue with the proposed change, the user is prompted to modify (56) the object or objects that are the subject of the proposed change. Referring back to block 49, if server 12 does not detect a concurrent change, the user is also prompted to modify (56) the object or objects that are the subject of the proposed change.

In response to the foregoing prompt, the user makes the proposed change and attempts to save the changes on client 21. At this point, client 21 checks (57) server 12 again to determine if there have been any concurrent changes that were initiated since the last concurrency check (49). As was the case above, client 21 may notify server 12 of the proposed change via a services call and ask server 12 whether there are any concurrent changes to the same master data affected by the proposed change. This second concurrency check is performed in order to ensure that a subsequent concurrent change has not been initiated in the time it took for the user to decide whether to proceed with, or abort, the proposed change and to perform the change. The process for performing the second concurrency check (block 59) is similar to that described above for performing the first concurrency check (block 49). One aim here is to make a client aware of parallel concurrent changes made to the same master data object, e.g., by another client. Depending on the necessity and severity of a proposed change, a client might decide to continue with the change or to abandon the proposed change in favor of another client's change.

Referring to FIG. 2, client 21 asks server 12 whether there are any concurrent changes to the same master data. In its communication to server 12, client 21 sends the proposed change (e.g., data update) and the identity of the object or objects that are the subject of the proposed change. Along with the proposed change, client 21 sends metadata to server 12. The metadata may be the same metadata described above.

Server 12 receives the foregoing data from client 21. Server 12 determines (59) whether there are any concurrent changes pending for the server master data. In particular, server 12 checks its pending flag and, if the pending flag is on, server 12 compares the metadata for the proposed change from client 21 with the metadata for a pending proposed change from, e.g., another client 16. If the metadata from both proposed changes indicates that they affect the same data independently, server 12 detects (60) a concurrent change to the server master data. If server 12 detects a concurrent change, server 12 sends a message to client 21 informing (61) client 21 of the concurrent change. The communication (61) here is the same as above (51). Client 21 receives the message from server 12 and, in view of the concurrent change, asks (62) the user whether to save the proposed change or to abort the proposed change. As above, client 21 may provide a pop-up window or other visual or audio indication to the user. The user then provides an input, based on which client 21 decides whether to save the proposed change or to abort the proposed change. If client 21 decides to abort (64) the proposed change, process 40 ends, at least with respect to the current proposed change. Concurrent changes are thereby prevented. If client 21 decides to save the proposed change, client 21 notifies (65) server 12 via, e.g., a services call. Also, if server 12 does not detect a concurrent change (59), client 21 notifies (65) server 12 via, e.g., a services call. The service call is comparable to communications (46) and (57).

More specifically, at block 65, client 21 notifies server 12 of the proposed change and requests that server 12 update its pending flag accordingly. Server 12 updates the pending flag (66) to indicate that change was made. Thereafter, client 21 saves (67) the proposed change to its master data. Although not shown in FIG. 2, server 12 may initiate a concurrency resolution process to resolve any conflicts between the proposed change from client 21 and the concurrent change on server 12. For example, the proposed change may result in a version "B" (Client 21) master data on client 21. The concurrent change on server 12 may produce a version "C" (Client 16) master data. Both versions "B" (Client 21) and "C" (Client 16) are based on version "A" (Server 12) master data, which is the current version of the master data on server 12. For example, the concurrency resolution process may be configured to identify, and to resolve, any inconsistencies between versions "B" (Client 21) and "C" (Client 16). The concurrency resolution process may consolidate the changes (from clients 16 and 21) to be made to the server master data (version "A" (Server 12)) and make the consolidated changes to the server master data. Server 12 may then post the resulting updated master data. Any type of concurrency resolution process may be used, including interactive and non-interactive processes.

Process 40 was described above in the context of two separate clients attempting to modify the same master data on server 12. Process 40 is not limited to use in this context. For example, process 40 may be used in cases where a change has already been made to the server master data when a new change to the master data is proposed. For example, assume that the server master data and the client master data were originally the same and defined as version "A" (Server 12). At some point, the server master data was changed, resulting in a version "C" (Server 12). The client 21 thereafter sends, to server 12, a proposed change that is identified by its metadata as version "B" (Client 21). In block 49, process 40 detects that the server master data was changed, resulting in a concurrent change to the server master data.

In more detail, in block 49, server 12 receives a proposed change and associated metadata, and stores the proposed change and associated metadata in staging area 27. Server 12 also compares the metadata associated with the proposed change to the metadata stored with the server master data. In particular, server 12 identifies the original master data (e.g., version "A" (Server 12)) from the metadata from client 21 and from the metadata stored with the server master data. Server 12 thus knows the baseline of the master data, meaning the point from which the copies of the master data on client 21 and server 12 were changed. Server 12 also identifies the version of the proposed change from client 21 (e.g., version "B" (Client 12)) and the version of the data currently stored on server 12 (e.g., version "C" (Client 21)). Since these two versions are different, server 12 determines (69) that there is a concurrent change to the server master data. Thereafter, process 40 proceeds as described above.

Similarly, process 40 can be used in cases where changes have been proposed to duplicate copies of an object on the same client. In this case, the proposed changes are sent to server 12, which registers a concurrent change in block 49 (since the objects are the same). Thereafter, process 40 proceeds as described above.

Figure 3:
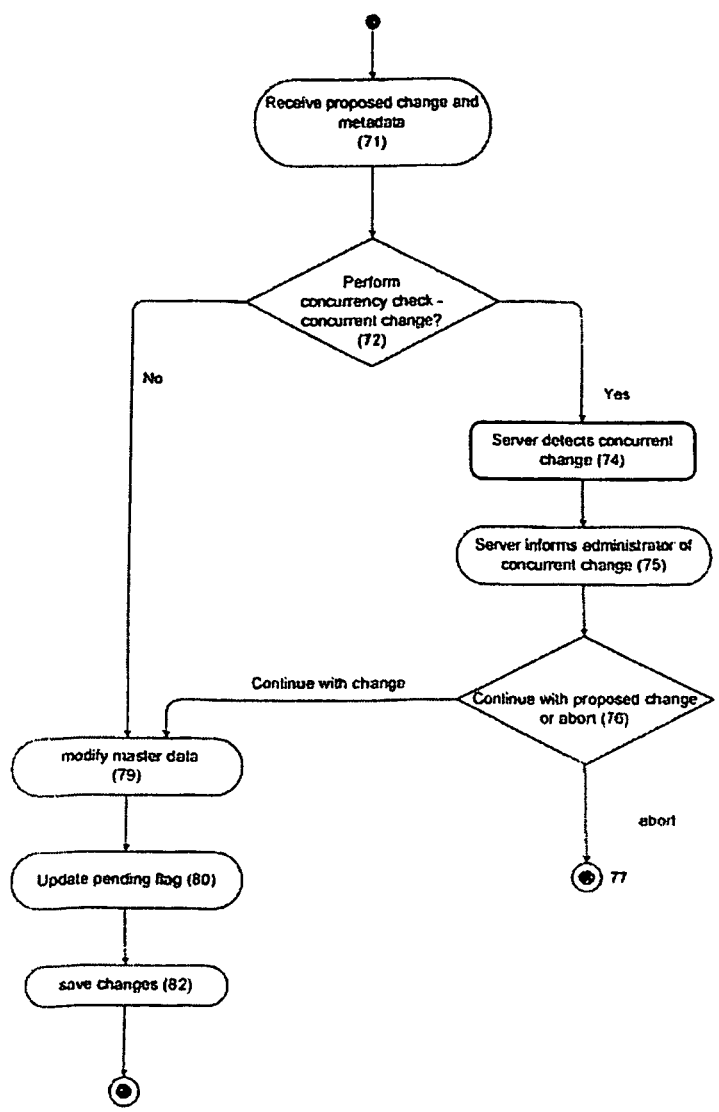
FIG. 3 is a flowchart of a process, which may be performed on a server, for deciding whether to continue with a proposed change on the server side or to abort the proposed change.

FIG. 3 shows a process 70 that is performed on server 12 to detect and either continue with, or abort, proposed changes to master data on the server.

In process 70, server 12 receives (71) the proposed change and/or identity of the object subject to change and associated metadata. This information may be input to the server by, e.g., an administrator. Server 12 determines (72) whether there are any concurrent changes pending for the master data stored on server 12. In this regard, when server 12 receives a proposed change and associated metadata, server 12 stores the proposed change and associated metadata along with the master data subject to change or in staging area 27. Server 12 also switches on a pending flag (e.g., one or more bits) to indicate that a change to the server master data is pending. To detect a concurrent change, server 12 checks the pending flag and, if it is on, server 12 compares the metadata for the proposed change with the metadata for a pending proposed change. If the metadata from both proposed changes indicates that the two proposed changes are different, server 12 detects (74) a concurrent change to the server master data.

If server 12 detects (74) a concurrent change, server 12 informs (75) the administrator of the concurrent change. For example, server 12 may provide a pop-up window or other visual or audio indication to the administrator. The administrator then provides an input, based on which server 12 decides (76) whether to continue with the proposed change or to abort the proposed change. If server 12 decides to abort (77) the proposed change, process 70 ends, at least with respect to the current proposed change. Concurrent changes are thereby prevented. If server 12 decides to continue with the proposed change, the administrator is prompted to modify (79) the object or objects that are the subject of the proposed change. Referring back to block 72, if server 12 does not detect a concurrent change, the administrator is also prompted to modify (79) the object or objects that are the subject of the proposed change. Thereafter, server 12 updates (80) the pending flag and saves (82) the change.

Process 70 may be used in cases where a change that has already been made to the server master data when a new change to the master data is proposed. Process 70 may also used in cases where changes are proposed to duplicate copies of an object on server 12.

Processes 40 and 70, or portions thereof, may be combined to form a single process for processing proposed changes. Process 40 and 70, and any changes thereto described above (referred to collectively as "the processes"), are not limited to use with the hardware and software described above; they may find applicability in any computing or processing environment and with any type of machine that is capable of running machine-readable instructions. The processes can be implemented in digital electronic circuitry, computer hardware, firmware, software, or combinations thereof.

The processes can be implemented via a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a standalone program or as a module, component, subroutine, or other unit suitable for use in a computing environment. A computer program can be deployed to be executed on one computer or on multiple computers at one site or distributed across multiple sites and interconnected by a communication network.

Actions associated with the processes can be performed by one or more programmable processors executing one or more computer programs to perform the functions of the processes. The actions can also be performed by, and the processes can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer include a processor for executing instructions and one or more memory devices for storing instructions and data. Generally, a computer will also include, or be operatively coupled to receive data from, or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., EPROM, EEPROM, and flash memory devices; magnetic disks, e.g., internal hard disks or removable disks; magneto-optical disks; and CD-ROM and DVD-ROM disks.

The processes can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the processes, or any combination of such back-end, middleware, or front-end components. The components of the system can be interconnected by any form or medium of digital data communication, e.g., a communication network. Examples of communication networks include a LAN and a WAN, e.g., the Internet.

Activities associated with the processes can be rearranged and/or one or more such activities can be omitted to achieve the same results described herein. All or part of the processes may be fully automated, meaning that they operate without user intervention, or interactive, meaning that all or part of the processes may include some user intervention.

Elements of different embodiments described herein may be combined to form other embodiments not specifically set forth above. Other embodiments not specifically described herein are also within the scope of the following claims.

What is claimed is:

1. A method to detect concurrent changes to master data and determine whether to accept a change in a networked environment, the method comprising:
   notifying a server, from a client over the networked environment, of a proposed change to the master data;
   receiving, from the server, an indication as to whether there is a concurrent change to the master data, the concurrent change comprising a change to the master data in addition to the proposed change; and
   deciding, at the client, whether to make the proposed change or to abort the change.

2. The method of claim 1, wherein the method is performed by the client of the server, and wherein communications between the client and the server are effected via services.

3. The method of claim 1, wherein deciding comprises:
   requesting, and receiving, an input from a user regarding whether to make the proposed change or to abort the change.

4. The method of claim 1, further comprising:
   making the proposed change to the master data;
   notifying the server that the proposed change has been made; and
   receiving an indication as to whether there is a subsequent concurrent change to the master data.

5. The method of claim 4, wherein, if there is a subsequent concurrent change to the master data, the method further comprises:
   requesting, and receiving, an input from a user regarding whether to save the proposed change or to abort the change.

6. The method of claim 5, wherein, if the input indicates to save the proposed change, the method further comprises:
   instructing the server to save the proposed change; and
   receiving an instruction from the server to save the proposed change.

7. The method of claim 6, further comprising:
   saving the proposed change in response to the instruction.

8. A computer program product stored on one or more machine-readable media, the computer program product comprising instructions that are operable to cause one or more processing devices to perform a method to detect concurrent changes to master data and determine whether to accept a change in a networked environment, the method comprising:
   notifying a server, from a client over the networked environment, of a proposed change to the master data;
   receiving, from the server, an indication as to whether there is a concurrent change to the master data, the concurrent change comprising a change to the master data in addition to the proposed change; and
   deciding, at the client, whether to make the proposed change or to abort the change.

9. The computer program product of claim 8, further comprising:
   executing the instructions within the client of the server; and
   effecting communications between the client and the server via Web services.

10. The computer program product of claim 8, wherein deciding comprises:
    requesting, and receiving, an input from a user regarding whether to make the proposed change or to abort the change.

11. The computer program product of claim 8, wherein the method further comprises:
    making the proposed change to the master data;
    notifying the server that the proposed change has been made; and
    receiving an indication as to whether there is a subsequent concurrent change to the master data.

12. The computer program product of claim 11, wherein, if there is a subsequent concurrent change to the master data, the method further comprises:
    requesting, and receiving, an input from a user regarding whether to save the proposed change or to abort the change.

13. The computer program product of claim 12, wherein, if the input indicates to save the proposed change, the method further comprises:
    instructing the server to save the proposed change; and
    receiving an instruction from the server to save the proposed change.

14. The computer program product of claim 13, wherein the method further comprises:
    saving the proposed change in response to the instruction.

15. A method to detect concurrent changes to master data and determine whether to accept a change in a networked environment, the method comprising:
    receiving a first input from a client over the networked environment, the first input being indicative of a proposed change to the master data;
    determining, in response to the first input, whether there is a concurrent change to the master data, the act of determining being performed by a server coupled to the networked environment, the concurrent change comprising a change to the master data in addition to the proposed change; and
    receiving a second input from the client to make the proposed change or to abort the change.

16. The method of claim 15, wherein the method is performed by the server, and wherein the first input and the second input are effected via Web services.

17. The method of claim 15, wherein determining comprises:
comparing first metadata associated with the proposed change to second metadata on the server, the second metadata corresponding either to the master data or to a second proposed change to the master data.

18. The method of claim 17, wherein the first metadata identifies a version of the possible update and a version of the master data upon which the possible update is based, and the second metadata identifies a current version of the master data and a version of the master data upon which the current version is based.

19. The method of claim 17, wherein the first metadata identifies a version of the possible update and a version of the master data upon which the possible update is based, and the second metadata identifies a version of the second possible update and a version of the master data upon which the second possible update is based.

20. The method of claim 17, further comprising:
outputting an indication that there is a concurrent change to the master data;
wherein the second input is received in response to the indication.

\* \* \* \* \*